US012079092B2

(12) United States Patent
Choi et al.

(10) Patent No.: US 12,079,092 B2
(45) Date of Patent: Sep. 3, 2024

(54) METHOD FOR RESTORING BACKUP DATA AND ELECTRONIC DEVICE THEREFOR

(71) Applicant: Samsung Electronics Co., Ltd., Suwon-si (KR)

(72) Inventors: Changmin Choi, Suwon-si (KR); Younggyun Lee, Suwon-si (KR); Youngdae Lee, Suwon-si (KR); Hyeonkyoon Lim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 18/151,591

(22) Filed: Jan. 9, 2023

(65) Prior Publication Data

US 2023/0161673 A1   May 25, 2023

Related U.S. Application Data

(63) Continuation of application No. PCT/KR2021/009951, filed on Jul. 30, 2021.

(30) Foreign Application Priority Data

Aug. 4, 2020  (KR) .................. 10-2020-0097237

(51) Int. Cl.
*G06F 11/00*   (2006.01)
*G06F 11/14*   (2006.01)
*G06F 21/60*   (2013.01)

(52) U.S. Cl.
CPC ...... *G06F 11/1469* (2013.01); *G06F 11/1464* (2013.01); *G06F 21/602* (2013.01)

(58) Field of Classification Search
CPC .................. G06F 11/1469; G06F 11/1464
USPC .......................... 714/6.3, 2, 15, 20
See application file for complete search history.

(56) References Cited

U.S. PATENT DOCUMENTS

| 6,735,691 | B1  | 5/2004 | Capps et al. |
| 7,234,077 | B2  | 6/2007 | Curran et al. |
| 7,873,865 | B2  | 1/2011 | Okada et al. |
| 8,104,068 | B2  | 1/2012 | Shiomi |
| 8,453,195 | B2  | 5/2013 | Shiomi |
| 8,458,762 | B2  | 6/2013 | Shiomi |
| 8,463,798 | B1* | 6/2013 | Claudatos ............. G06F 16/178 707/752 |

(Continued)

FOREIGN PATENT DOCUMENTS

| CN | 107179966 A | * | 9/2017 | .......... G06F 11/1402 |
| JP | 2008-181287 A | | 8/2008 | |

(Continued)

*Primary Examiner* — Chae M Ko
(74) *Attorney, Agent, or Firm* — Jefferson IP Law, LLP

(57) ABSTRACT

An electronic device is provided. The electronic device includes a communication circuit, a processor, and a memory. The memory may store instructions that, when executed, allow the processor to connect to an external electronic device by using the communication circuit, receive, from the external electronic device, backup data including application information and application-related data, install a plurality of applications by using the application information, and on the basis of priority orders, sequentially restore configurations of the plurality of applications by using the application-related data.

20 Claims, 9 Drawing Sheets

(56) References Cited

U.S. PATENT DOCUMENTS

| | | |
|---|---|---|
| 8,850,511 B2 | 9/2014 | Shiomi |
| 8,868,859 B2 | 10/2014 | Schmidt et al. |
| 9,037,906 B2 | 5/2015 | Kim et al. |
| 9,081,720 B2* | 7/2015 | Takigawa ............ G06F 9/44505 |
| 9,483,365 B2 | 11/2016 | Schmidt et al. |
| 9,588,846 B2 | 3/2017 | Kim et al. |
| 9,852,026 B2 | 12/2017 | Mitkar et al. |
| 9,864,657 B2 | 1/2018 | Hu |
| 10,282,131 B2 | 5/2019 | Sugimoto |
| 10,360,110 B2 | 7/2019 | Mitkar et al. |
| 10,705,913 B2 | 7/2020 | Mitkar et al. |
| 11,249,858 B2 | 2/2022 | Mitkar et al. |
| 2004/0267822 A1 | 12/2004 | Curran et al. |
| 2006/0036658 A1* | 2/2006 | Henrickson ......... G06F 11/1458 |
| | | 714/E11.122 |
| 2008/0178185 A1 | 7/2008 | Okada et al. |
| 2009/0125570 A1* | 5/2009 | Bailey .................... G06F 16/50 |
| 2012/0117558 A1* | 5/2012 | Futty .................. G06F 9/44505 |
| | | 717/176 |
| 2012/0311280 A1 | 12/2012 | Schmidt et al. |
| 2013/0325809 A1 | 12/2013 | Kim et al. |
| 2015/0006837 A1 | 1/2015 | Schmidt et al. |
| 2016/0041880 A1 | 2/2016 | Mitkar et al. |
| 2016/0292042 A1 | 10/2016 | Hu |
| 2018/0143767 A1 | 5/2018 | Sugimoto |
| 2018/0260124 A1* | 9/2018 | Schucker ............ G06F 11/1469 |
| 2018/0260206 A1* | 9/2018 | Pandey .................... G06F 8/62 |
| 2022/0004464 A1 | 1/2022 | Mitkar et al. |

FOREIGN PATENT DOCUMENTS

| | | |
|---|---|---|
| JP | 2013-258512 A | 12/2013 |
| KR | 10-2005-0001301 A | 1/2005 |
| KR | 10-2006-0027952 A | 3/2006 |
| KR | 10-2008-0097976 A | 11/2008 |
| KR | 10-2013-0081417 A | 7/2013 |
| KR | 10-2013-0136184 A | 12/2013 |
| KR | 10-2014-0031366 A | 3/2014 |
| KR | 10-2112683 B1 | 6/2020 |
| KR | 10-2022-0016704 A | 2/2022 |

\* cited by examiner

METHOD FOR RESTORING BACKUP DATA AND ELECTRONIC DEVICE THEREFOR

CROSS-REFERENCE TO RELATED APPLICATION(S)

This application is a continuation application, claiming priority under § 365(c), of an International application No. PCT/KR2021/009951, filed on Jul. 30, 2021, which is based on and claims the benefit of a Korean patent application number 10-2020-0097237, filed on Aug. 4, 2020, in the Korean Intellectual Property Office, the disclosure of which is incorporated by reference herein in its entirety.

BACKGROUND

1. Field

The disclosure relates to a method for restoring backup data and an electronic device for performing the method.

2. Description of Related Art

If a user changes his/her user device, the user may want to similarly apply a usage environment of an existing user device to a new user device. For example, the user may want to use data and applications stored in the existing user device in the new user device. A backup application (e.g., Samsung Smart Switch) may restore a usage environment in a new user device by using data and applications stored in an existing user device. For example, the backup application may immigrate data and applications stored in the existing user device to the new user device through a wired connection or a wireless connection. The backup application may support data immigration between devices of the same operating system or between devices of different operating systems.

The above information is presented as background information only to assist with an understanding of the disclosure. No determination has been made, and no assertion is made, as to whether any of the above might be applicable as prior art with regard to the disclosure.

SUMMARY

Storage capacity of user devices tends to be gradually increasing. Accordingly, the amount of data stored by the user device is thus increasing. If the user changes his/her device, amount of backup data that needs to be immigrated also increases. If the amount of backup data is increased, the time taken for immigrating the backup data and restoring using the backup data may be increased. For example, even if the immigration of the backup data is completed, the use of the user device may be limited before restoration of settings. This is because errors may occur due to user manipulation before installation is completed. Accordingly, the user may have to wait a long time while the immigration and restoration of the backup data are completed.

Aspects of the disclosure are to address at least the above-mentioned problems and/or disadvantages and to provide at least the advantages described below. Accordingly, an aspect of the disclosure is to provide an electronic device and a method for solving the above-described problems.

Another aspect of the disclosure is to provide a method which prevents data loss that may occur during data transmission and provide users with continuous usability of the electronic device (user device), in restoring data by using a backup application.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a processor, and a memory connected to the processor, in which the memory stores instructions that, when executed, cause the processor to connect to an external electronic device by using the communication circuit, receive backup data including application information and application-related data from the external electronic device, install a plurality of applications by using the application information, and sequentially restore settings of the plurality of applications by using the application-related data based on priorities.

In accordance with another aspect of the disclosure, a method for restoring data of an electronic device is provided. The method includes connecting to an external electronic device, receiving backup data including application information and application-related data from the external electronic device, installing a plurality of applications by using the application information, and sequentially restoring settings of the plurality of applications by using the application-related data based on priorities.

According to various embodiments disclosed in the disclosure, the electronic device may reduce the use limit time of the user by restoring the backup data based on the priority order.

According to an embodiment disclosed in the disclosure, the electronic device may improve the user experience by restoring backup data based on the intention of the user.

According to an embodiment disclosed in the disclosure, the electronic device may prevent a restoration error by using a temporary application before restoration of settings.

According to an embodiment disclosed in the disclosure, the electronic device may prevent a restoration error by using backup data encrypted with a predefined key.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
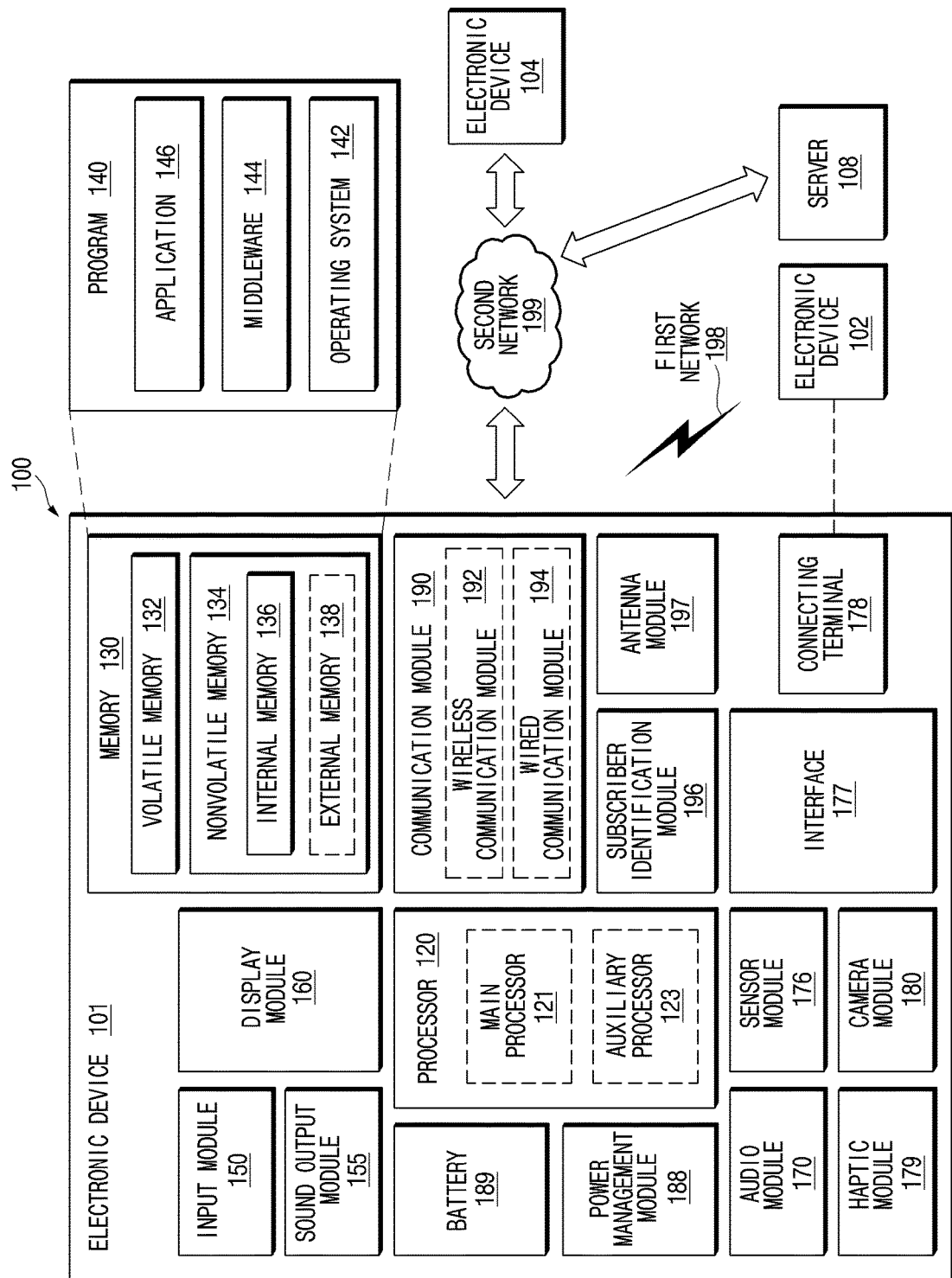
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
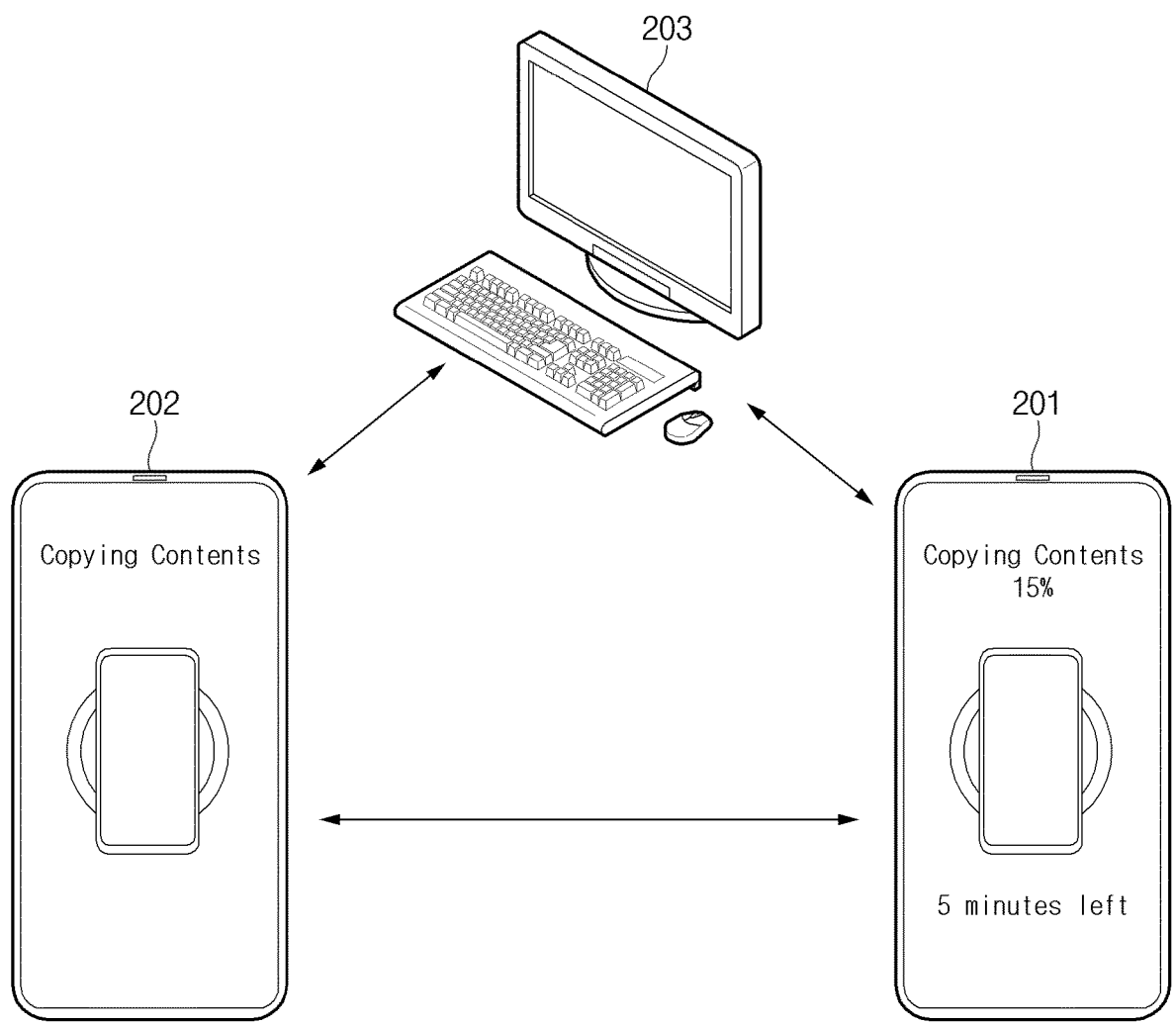
FIG. 2 illustrates a backup data exchange environment according to an embodiment of the disclosure.

FIG. 2 illustrates a backup data exchange environment according to an embodiment of the disclosure.

An electronic device 201 (e.g., the electronic device 101 of FIG. 1) may receive backup data from an external electronic device 202. For example, a user may execute a backup application on the electronic device 201 and immigrate the backup data in the external electronic device 202 to the electronic device 201 using the backup application.

For example, the electronic device 201 may receive backup data from the external electronic device 202. The electronic device 201 may establish a device-to-device wireless connection (e.g., Wi-Fi direct connection) with the external electronic device 202, and receive backup data through the wireless connection. According to another embodiment, the electronic device 201 may receive backup data through a wired connection with the external electronic device 202. The electronic device 201 may receive backup data through a wireless connection and/or a wired connection with an external electronic device. The backup application of the electronic device 201 and the backup application of the external electronic device 202 may control device-to-device connection and/or transfer of backup data.

For example, the electronic device 201 may receive backup data from the external electronic device 202 through a storage device 203. The external electronic device 202 may store backup data in the storage device 203 (e.g., a memory device, a personal computer, or a server device). The electronic device 201 may acquire backup data from the storage device 203. The backup application of the electronic device 201 and the backup application of the external electronic device 202 may control device-to-device connection and/or transfer of backup data among the electronic device 201, the external electronic device 202, and/or the storage device 203.

For example, the electronic device 201 may receive backup data through the storage device 203 and the external electronic device 202. The electronic device 201 may receive a portion of the backup data through the storage device 203 and receive the other portion through the external electronic device 202. The backup application of the electronic device 201 and the backup application of the external electronic device 202 may control device-to-device connection and/or transfer of backup data.

For example, the backup data may include at least one of user contents, setting information, application information, and/or application-related data. For example, the backup application may set information and/or data to be included in the backup data based on a user input. User contents may include contents generated or acquired by the user.

For example, the user contents may include contact information (e.g., phone number, email address, group information, and/or profile picture), messages (e.g., short message service (SMS), email, and/or multimedia messaging service (MMS)), photos, videos, music (e.g., original contents, and/or playlists), documents, phone information (e.g., recent calls, missed calls, and/or call block lists), alarm and time settings (e.g., alarm time, alarm on/off settings, and/or world time list), voice memos (e.g., voice memo title and voice memo data), internet information (e.g., bookmarks and/or history), calendar information, and/or memo information (e.g., memo contents and/or date and time of memo).

For example, application information and application-related data may be referred to as home data. The home data may include information related to a home screen. For example, the home data may include layout information (e.g., icon location and/or folder information on the screen) for the home screen, application information (e.g., installed application information), application-related information, and/or a background image (e.g., home screen background image and/or lock screen background image) information. The application information may include, for example, information for an application downloaded and/or installed on the external electronic device 202 (e.g., application identification information and/or an application installation file (e.g., base.apk)). For example, the application-related information may include setting information for an application (e.g., application permission information and/or application account information) and/or application-related data (e.g., data generated using the application and/or data acquired through the application).

For example, the setting information may include option setting information for the external electronic device 202 by the user. The setting information may include, for example, keyboard setting (e.g., keyboard layout, keyboard language, and/or keyboard type), ringtone setting, and/or function setting information.

Figure 3:
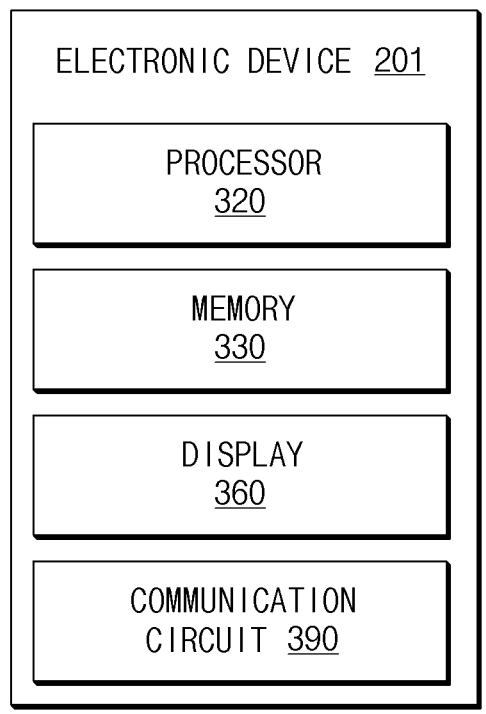
FIG. 3 illustrates a block diagram of the electronic device according to an embodiment of the disclosure.

FIG. 3 illustrates a block diagram of the electronic device according to an embodiment of the disclosure.

According to an embodiment, the electronic device 201 may include a processor 320 (e.g., the processor 120 of FIG. 1), a memory 330 (e.g., the memory 130 of FIG. 1), a display 360 (the display module 160 of FIG. 1), and/or a communication circuit 390 (e.g., the communication module 190 of FIG. 1). The processor 320 may be operatively connected to other components of the electronic device 201 and may control various operations of the electronic device 201. The processor 320 may perform various operations of the electronic device 201 by executing one or more instructions stored in the memory 330. Hereinafter, operations described as being performed by the electronic device 201 may be referred to as being performed by the processor 320. The memory 330 may be operatively connected to at least the processor 320 and may store instructions. The memory 330 may store various types of information. For example, the memory 330 may store a backup application for exchanging backup data. The communication circuit 390 may support communication based on a plurality of communication protocols. For example, the plurality of communication protocols may include Bluetooth (e.g., Bluetooth legacy and/or Bluetooth low energy), Wi-Fi (e.g., Wi-Fi Direct), near field communication (NFC), ultra-wide band (UWB) communication, infrared (infra-red) communications, and/or cellular communication.

According to an embodiment, the electronic device 201 may communicate with an external electronic device (e.g., the external electronic device 202 of FIG. 2) using the communication circuit 390. For example, the electronic device 201 may communicate with the external electronic device 202 by wire and/or wirelessly under the control of the backup application. The electronic device 201 may receive backup data from the external electronic device 202 using the communication circuit 390.

According to an embodiment, the electronic device 201 may receive backup data based on priorities. Data essential for driving the electronic device 201 may have a higher priority than additional data. For example, application information and application-related data may have a higher priority than photo and video data. For example, data having a large capacity may have a higher priority than data having a small capacity. For example, among user contents, contact information, phone information, and a message may have a higher priority than photo and video data.

According to an embodiment, the electronic device 201 may restore the execution environment of the electronic device 201 using the received backup data. For example, the electronic device 201 may restore the execution environment substantially simultaneously with the reception of the backup data. By first restoring the backup data having the higher priority order, the electronic device 201 may be available to the user before all data is restored. For example, the electronic device 201 may provide a home screen to the display 360 before restoration is completed. The backup application may operate in the background of the electronic device 201. The user may execute an application in the electronic device 201 through a touch input to the home screen.

According to an embodiment, the electronic device 201 may restore an application according to the priorities. In order to restore the application, the electronic device 201 may install the application and/or restore the settings of the application.

According to an embodiment, the electronic device 201 may acquire application information installed and/or downloaded on the external electronic device 202 using application information in the backup data. For example, if a first application included in the application information is installed on the electronic device 201, the electronic device 201 may omit the installation of the first application. For another example, if a second application included in the application information is not installed on the electronic device 201, the electronic device 201 may install the second application on the electronic device 201. The electronic device 201 may install the second application on the electronic device 201 using an installation file (e.g., base.apk) of the second application included in the application information. The electronic device 201 may download and install the second application from an external server (e.g., an application store, Play Store, or Galaxy Store) using identification information for the second application included in the application information.

According to an embodiment, the electronic device 201 may restore settings of the application using the application-related data in the backup data. For example, the electronic device 201 may restore application setting information. The application setting information may include, for example, account information (e.g., profile information and/or login information) related to the application. The electronic device 201 may restore the settings of the application by storing data related to the application in a folder related to the application.

According to an embodiment, the electronic device 201 may restore the settings based on priorities of installed applications. In an example, the electronic device 201 may restore the settings of the application according to specified priorities. The electronic device 201 may sequentially restore settings according to a priority specified for each application. In an example, the electronic device 201 may set priorities based on execution information. The electronic device 201 may set priorities in order of execution frequency in the external electronic device 202 or in order of recent execution in the external electronic device 202. In an example, the electronic device 201 may set the priorities based on the file size. The electronic device 201 may set the priorities in order of decreasing file size or in order of increasing file size. In an example, the electronic device 201 may set the priorities based on at least one of an execution frequency, an execution history, and a file size.

In an embodiment, the electronic device 201 may perform the restoration of settings based on the specified priorities and/or the execution information. The electronic device 201 may restore the settings of specified applications according to the priorities, and then restore the settings of the remaining applications based on the execution information. For example, the electronic device 201 may restore the settings of a specified application (e.g., a calendar application and a messenger application), and then restore settings of the remaining applications in order of most recent execution.

According to an embodiment, the electronic device 201 may change the priorities of the setting restoration based on a user input. For example, the electronic device 201 may acquire a user input instructing execution of an application that has been installed but has not been restored. In this case, the electronic device 201 may change the priorities of the restoration so that the application to be executed upon a request may be restored first. The electronic device 201 may change the priorities of the restoration so that the application related to the application to be executed upon the request may be restored subsequent to the application to be executed upon the request. For example, if the user instructs execution of the phone application, the electronic device 201 may change the priorities of the restoration so that the phone application may be first restored and then an associated application (e.g., the contact application and/or the 3rd party phone application) may be subsequently restored. For example, if the user instructs execution of the camera application, the electronic device 201 may change the priorities of the restoration so that the phone application may be first restored and then an associated application (e.g., the gallery application and/or the 3rd party camera application) may be subsequently restored.

According to an embodiment, the electronic device 201 may provide a user interface (UI) related to the priorities of the setting restoration through the display 360. For example, the electronic device 201 may receive information related to the priorities of the setting restoration from the external electronic device 202 and/or the storage device 203, and may provide the UI for acquiring a user input based on the received information. For example, information related to the priorities of the setting restoration may be acquired based on the usage time, execution number, and/or installation date of a plurality of applications in the external electronic device 202 and/or the storage device 203, and a list of the plurality of applications may be provided through the display 360 based on the acquired information. The electronic device 201 may determine (or change) priorities of the setting restoration for a plurality of applications through a user input, and may restore the settings according to the determined (or changed) priorities.

According to an embodiment, at least one of the backup applications of the electronic device 201, the external electronic device 202, and/or the storage device 203 may provide a list of a plurality of applications using information related to the priorities of the setting restoration. For example, the external electronic device 202 may generate a list of a plurality of applications and provide it to the electronic device 201. The electronic device 201 may generate the list of the plurality of applications based on information acquired from the external electronic device 202 and/or the storage device 203 (e.g., information related to the priorities of the setting restoration).

According to an embodiment, the electronic device 201 may display an icon of an installed application on the display 360. After the application is installed, and before restoring the settings of the installed application, the electronic device 201 may display an icon in a state indicating that restoration of the corresponding application is not completed. For example, the electronic device 201 may display the icon in a dimmed state (e.g., a relatively low saturation state, a relatively low luminance state, or a translucent state). If the restoration of the setting of the installed application is completed, the electronic device 201 may display an icon in a state indicating that restoration of the corresponding application is completed. For example, the electronic device 201 may display the icon in the original state instead of the dimmed state.

In the above examples, it has been described that the settings of the application are restored after the application has been installed, but embodiments of the disclosure are not limited thereto. The installation and setting restoration may be performed substantially simultaneously. In an example, application-related data may be encrypted for protection of personal information or the like. According to an embodiment, the backup application may transfer application-related data encrypted with a random encryption key to the first application. If the first application is installed, the backup application may transfer encryption key information using a data sharing message (e.g., broadcast extra) between applications. The first application may decrypt the application-related data application-encrypted using the received encryption key information (e.g., SESSION_KEY), and restore the settings using the application-related data.

If the first application is not installed yet, the backup application may not be able to transfer the encryption key information to the first application. In this case, the backup application may encrypt the application-related data using a specified encryption key instead of the random encryption key, and store the encrypted application-related data in a specified path. The first application may have information about the specified encryption key. After being installed, the first application may check whether application-related data exists in the specified path. If the application-related data exists, the application-related data may be decrypted using the specified encryption key, and the settings may be restored using the application-related data.

According to an embodiment, although the application is installed, before the settings of the corresponding application is restored, the electronic device 201 may acquire a user input instructing execution of the corresponding application (e.g., through a touch input). In this case, the electronic device 201 may generate and execute a temporary application of the corresponding application. The temporary application may mean a state in which the application is installed, but the settings are not restored. If the restoration of settings of the corresponding application is completed, the electronic device 201 may integrate data for the temporary application into the application of which the restoration has been completed. For example, the application-related data may include a profile. In the application, there may be an existing profile, and there may be a profile created for the temporary application. In this case, the electronic device 201 may provide the user with a UI for selecting a profile to be used for the corresponding application. For example, if a plurality of profiles exist for a corresponding application and the number of the plurality of profiles exceeds a specified maximum number of profiles, the electronic device 201 may delete the profile with the least usage time.

According to an embodiment, the external electronic device 202 may transmit backup data based on the priorities. As described above, data essential for driving the electronic device 201 may have a higher priority than additional data.

According to an embodiment, the external electronic device 202 may generate backup data based on the priorities. For example, the external electronic device 202 may generate backup data according to the specified priorities. For example, the external electronic device 202 may set the priorities based on the execution information (execution frequency and/or execution history). In an example, the external electronic device 202 may set the priorities in order of decreasing file size or in order of increasing file size. In an example, the external electronic device 202 may set the priorities based on at least one of an execution frequency, an execution history, and a file size.

In an embodiment, the external electronic device 202 may generate backup data based on the specified priorities and/or the execution information. The external electronic device 202 may generate backup data for applications specified according to the priorities, and then may generate backup data for the remaining applications based on the execution information.

The components of the electronic device 201 and the external electronic device 202 illustrated in FIG. 3 are exemplary, and examples of the disclosure are not limited thereto. For example, the electronic device 201 and/or the external electronic device 202 may further include a component not illustrated in FIG. 3.

According to an embodiment, the display 360 may visually provide information to the outside (e.g., the user) of the electronic device 201. The display 360 may include, for example, a display, a hologram device, or a projector and control circuitry to control a corresponding one of the display, hologram device, and projector. According to an embodiment, the display 360 may include a touch sensor adapted to detect a touch, or a pressure sensor adapted to measure the intensity of force incurred by the touch. In an embodiment, the display 360 may take a rollable or foldable shape. In various embodiments, the priorities of the setting restoration may be determined (or changed) depending on a state of the electronic device 201 (e.g., a folded state, a half-folded state, an unfolded state, a rolled state, a half-unrolled state, or an unrolled state). For example, in a first state (e.g., the rolled or folded state), the electronic device 201 may generate backup data based on the specified priorities, and in a second state (e.g., the unrolled or unfolded state), the electronic device 201 may generate backup data based on the execution information.

Figure 4:
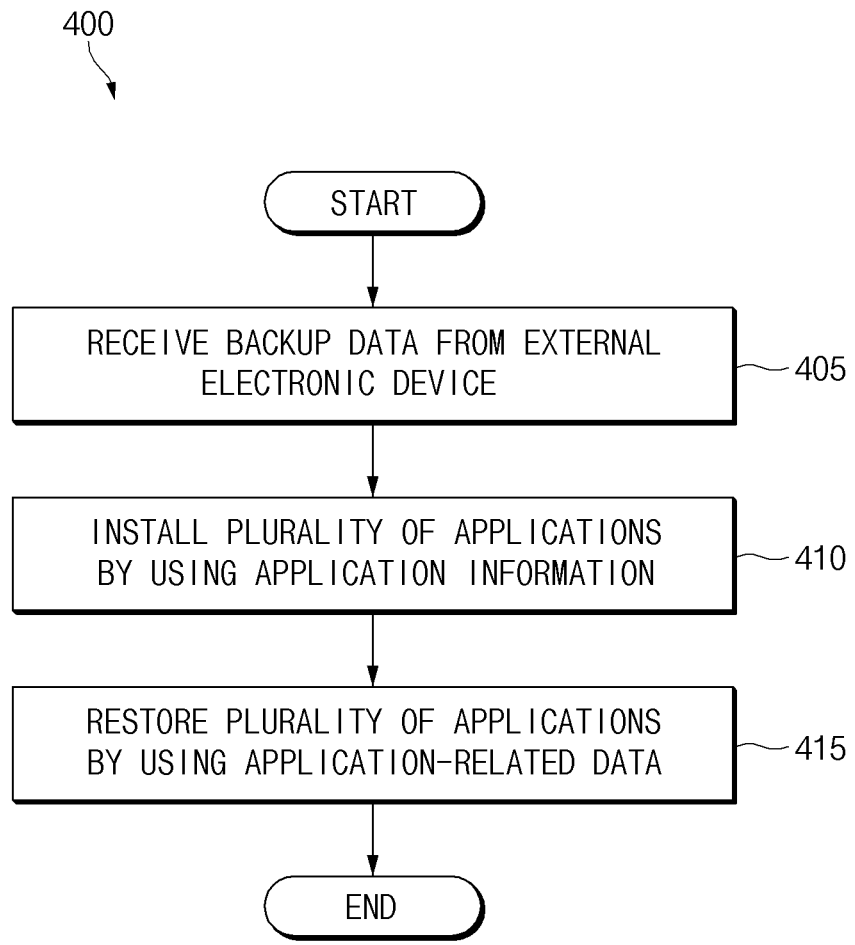
FIG. 4 is a flowchart of a restoration method according to an embodiment of the disclosure.

FIG. 4 is a flowchart 400 of a restoration method according to an embodiment of the disclosure.

In operation 405, the electronic device 201 may receive backup data from the external electronic device 202. The electronic device 201 may receive backup data directly from the external electronic device 202 or through a storage device (e.g., the storage device 203 of FIG. 2) using a wireless connection and/or a wired connection. The connection between the electronic device 201 and the external electronic device 202 and/or backup data reception may be performed by a backup application of the electronic device 201. The backup data may include at least one of user contents, setting information, application information, and/or application-related data. For example, the electronic device 201 may receive the backup data according to priorities.

In operation 410, the electronic device 201 may install a plurality of applications using application information included in the backup data. For example, the electronic device 201 may install a plurality of applications by downloading the applications from an external server using the application information or using an installation file included in the application information. The electronic device 201 may install a plurality of applications according to the priorities.

In operation 415, the electronic device 201 may restore the plurality of applications using application-related data included in the backup data. The electronic device 201 may restore account information, setting information, and/or data for an application using the application-related data. The electronic device 201 may restore settings of the plurality of applications according to the priorities. For example, the electronic device 201 may restore settings of the application using application-related data encrypted with a random key generated by the backup application or using application-related data encrypted with a specified key.

For example, the electronic device 201 may restore settings after installation of the application is completed. In this case, after checking that the installation of the application is completed, the electronic device 201 may attempt to restore settings of the corresponding application. However, as described above with reference to FIG. 3, installation of the application and restoration of settings may be performed substantially simultaneously.

Figure 5:
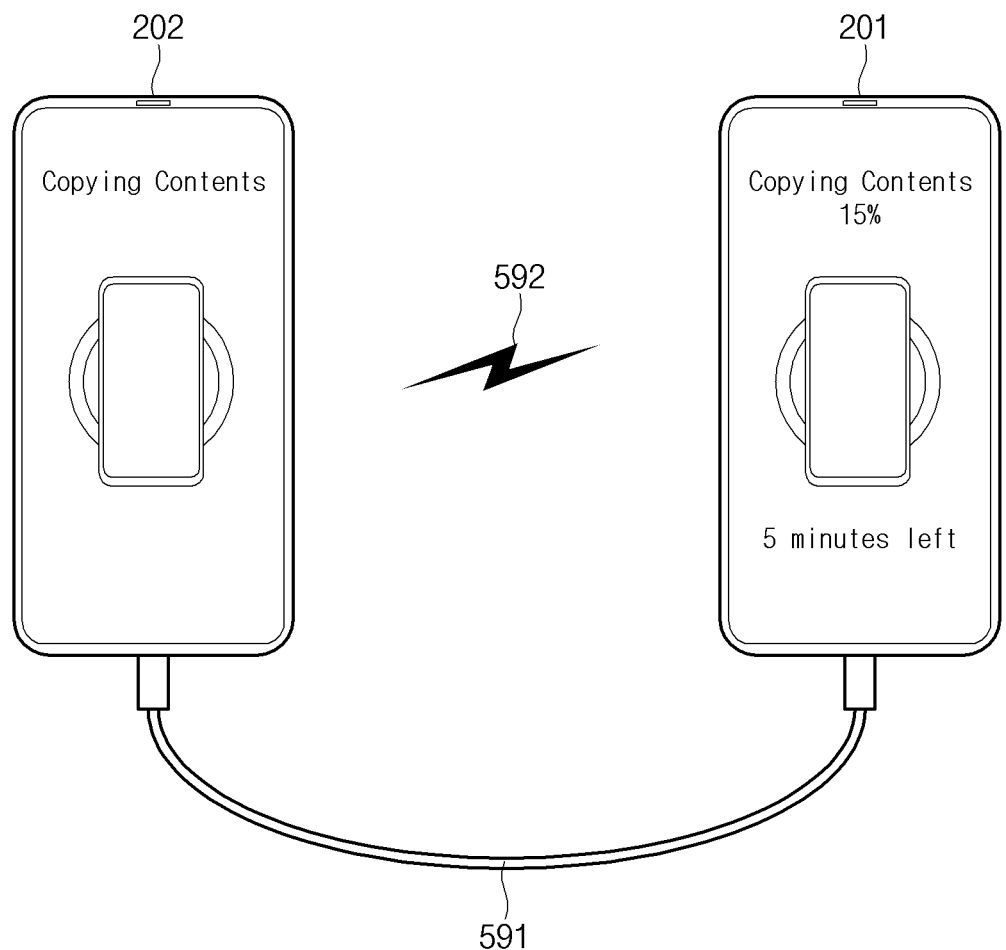
FIG. 5 illustrates a backup data exchange environment through wired and wireless connections according to an embodiment of the disclosure.

FIG. 5 illustrates a backup data exchange environment through wired and wireless connections according to an embodiment of the disclosure.

According to an embodiment, the electronic device 201 may receive backup data from an external electronic device through a wired connection 591 and a wireless connection 592 (e.g., operation 405 of FIG. 4). According to an example, the electronic device 201 may receive the backup data by substantially simultaneously using the wireless connection 592 and the wired connection 591. By using both connections, it is possible to reduce the transmission time of the backup data.

According to an embodiment, the external electronic device 202 may transmit the backup data to the electronic device according to the priorities. The external electronic device 202 may transfer a file to be transmitted to a currently empty network socket according to the priorities. For example, the external electronic device 202 may transmit the files to the electronic device 201 according to priorities having the order of file 1, file 2, file 3, file 4, and file 5. At an initial state, both the network socket of the wired connection 591 and the network socket of the wireless connection 592 may be available. In this case, the external electronic device 202 may transmit the file 1 to the electronic device 201 using the wired connection 591 and transmit the file 2 to the electronic device 201 using the wireless connection 592. For example, if both connections are available, the external electronic device 202 may allocate a file having a higher priority to the wired connection 591. Even after the transmission of the file 1 is completed, the transmission of the file 2 may not be completed. In this case, the external electronic device 202 may sequentially transmit the file 3 and the file 4 using the wired connection 591 that is available. Transmission of the file 2 may be completed during transmission of the file 4. The external electronic device 202 may transmit the file 5 using the wireless connection 592 that is available.

According to an embodiment, the external electronic device 202 may dynamically allocate the files to each channel based on the size of the file and/or the channel state (e.g., throughput or transmission speed) of each connection. For example, the external electronic device 202 may allocate a file having a large file size to a channel having a good channel state, and may allocate files having small file sizes to a channel having a relatively poor channel state. Conversely, the external electronic device 202 may allocate a plurality of files having small file sizes to a channel having a good channel state, and may allocate a file having a large file size to a channel having a relatively poor channel state.

Figure 6:
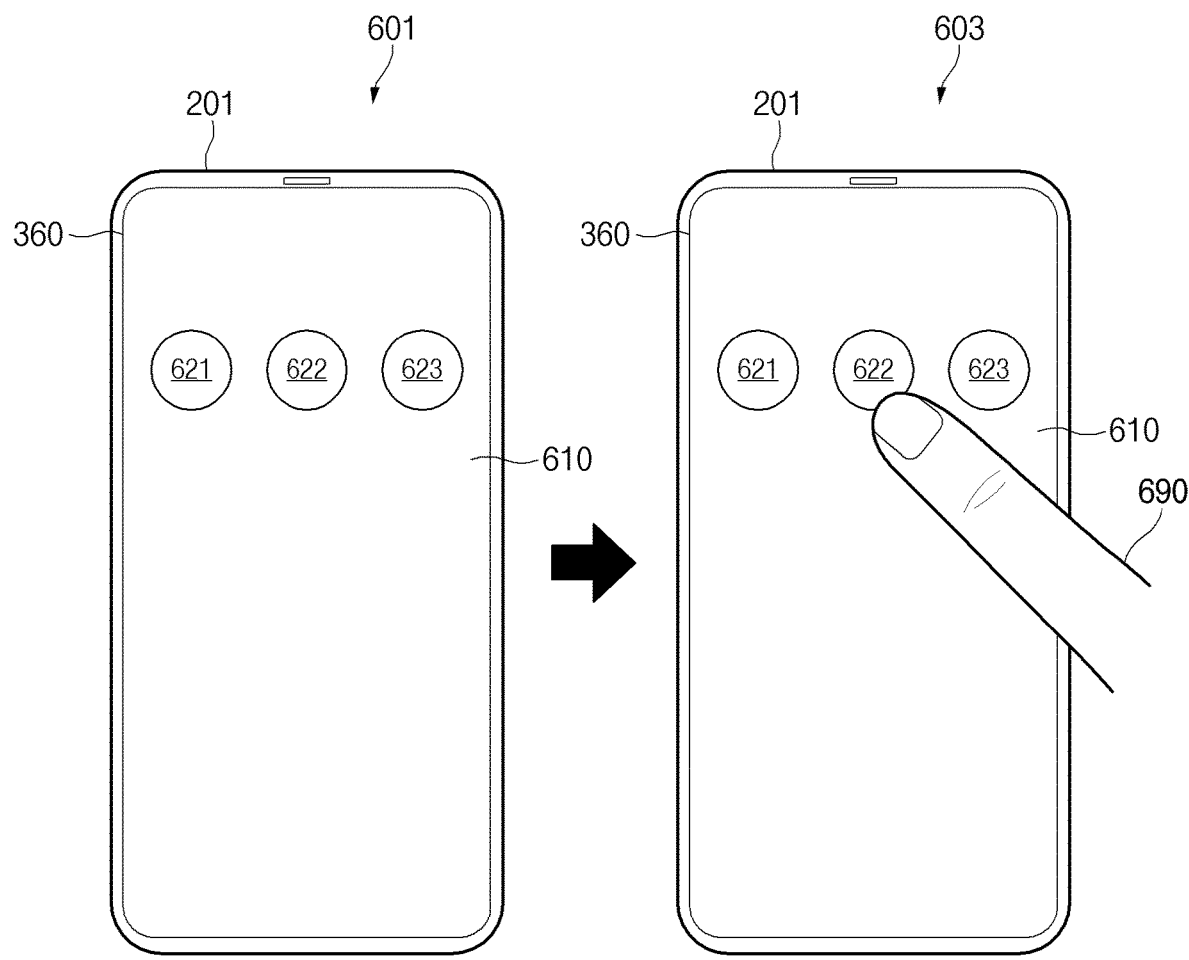
FIG. 6 illustrates reception of a user input during backup data restoration according to an embodiment of the disclosure.

Referring to FIG. 6, the wired connection 591 and the wireless connection 592 are mainly exemplified; however, embodiments of the disclosure are not limited thereto. For example, wired connection 591 may be replaced with any other wireless connection that supports a protocol different from wireless connection 592.

FIG. 6 illustrates reception of a user input during backup data restoration according to an embodiment of the disclosure.

Referring to FIG. 6, a first icon 621 may correspond to the first application, a second icon 622 may correspond to the second application, and a third icon 623 may correspond to a third application.

According to an embodiment, referring to reference numeral 601, the electronic device 201 may install the first application, the second application, and the third application using backup data (e.g., operation 410 of FIG. 4). For example, the electronic device 201 may display the first icon 621, the second icon 622, and the third icon 623 on a home screen 610 of the display 360 as the applications are installed. In the example of FIG. 6, it may be assumed that restoration of settings of the first application is completed, but restoration of settings of the second application and the third application is not completed. In this case, the electronic device 201 may display the second icon 622 and the third icon 623 in a state different from that of the first icon 621. For example, the electronic device 201 may display the second icon 622 and the third icon 623 in a dimmed state, and display the first icon 621 without being dimmed.

According to an embodiment, referring to reference numeral 603, a user input 690 for the second icon 622 may be received. As described above, the second application may be in a state in which it is installed, but restoration of settings is not completed. If the user input 690 is received, the electronic device 201 may change the priority of the second application in restoration of settings. For example, the electronic device 201 may be configured to, before receiving the user input 690, restore settings of the third application and then restore settings of the second application according to the priorities. If the user input 690 is received, the electronic device 201 may change the priorities so that the settings of the second application may be preferentially restored.

According to an embodiment, if the user input 690 is received, the electronic device 201 may execute a temporary application for the second application. The temporary application may correspond to, for example, an initial installation state of the second application. If the restoration of settings of the second application is completed, the electronic device 201 may integrate the temporary settings of the temporary application and the restored settings or may select one of the temporary settings and the restored settings. For example, the electronic device 201 may display a UI for selecting a setting.

Figure 7:
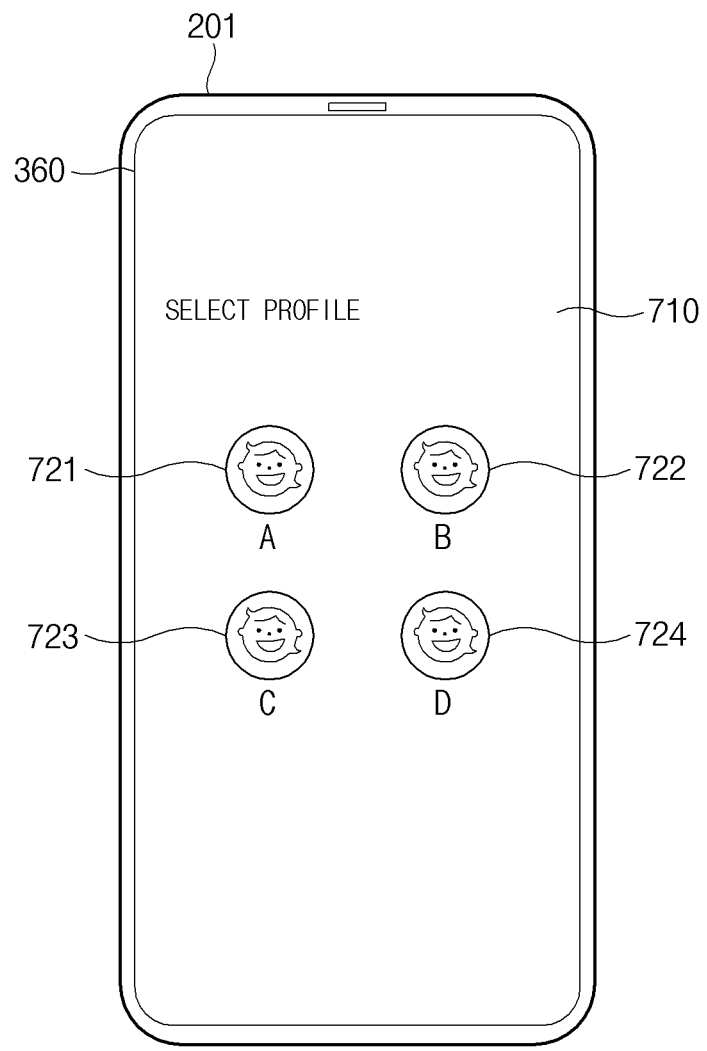
FIG. 7 illustrates a profile selection user interface (UI) according to an embodiment of the disclosure.

FIG. 7 illustrates a profile selection UI according to an embodiment of the disclosure.

Referring to FIG. 7, the electronic device 201 may display a selection UI 710 on the display 360. For example, the selection UI 710 may include a first icon 721 corresponding to a profile A, a second icon 722 corresponding to a profile B, a third icon 723 corresponding to a profile C, and a fourth icon 724 corresponding to a profile D. For example, the profiles A, B, and C may be profiles according to restored settings, and the profile D may be a profile according to temporary settings of the temporary application. Based on an input (user input) for the selection UI 710, the electronic device 201 may select a profile to be used in the application.

In an example, some profiles may occur in excess of the maximum number of profiles allowed in the corresponding application due to the integration of the restored settings and the temporary settings. In this case, the electronic device 201 may delete at least some of the plurality of profiles. For example, even if a usage time of the corresponding application (e.g., usage time in the electronic device 201) exceeds a specified time (e.g., 24 hours), the selection of the application to be used may not be received from the user. In this case, the electronic device 201 may leave only the number of profiles corresponding to the maximum number of profiles and delete the remaining profiles. For example, the electronic device 201 may delete profiles in the order of the least usage time among the profiles.

The application may support a main profile and a guest profile. According to an embodiment, the electronic device 201 may add a temporary profile (e.g., the profile D (724)) as the main profile or guest profile of the application. The electronic device 201 may add the temporary profile as the guest profile. For example, if there is the main profile in existing profiles (e.g., the profiles A, B, and C (721, 722, and 723)), the electronic device 201 may add the temporary profile as the guest profile. For another example, if there is not the main profile in existing profiles (e.g., the profiles A, B, and C (721, 722, and 723)), the electronic device 201 may add the temporary profile as the main profile. For yet another example, the electronic device 201 may provide a UI for selecting the main profile to be used in the application from among the main profile and the temporary profile of the existing profiles.

Figure 8:
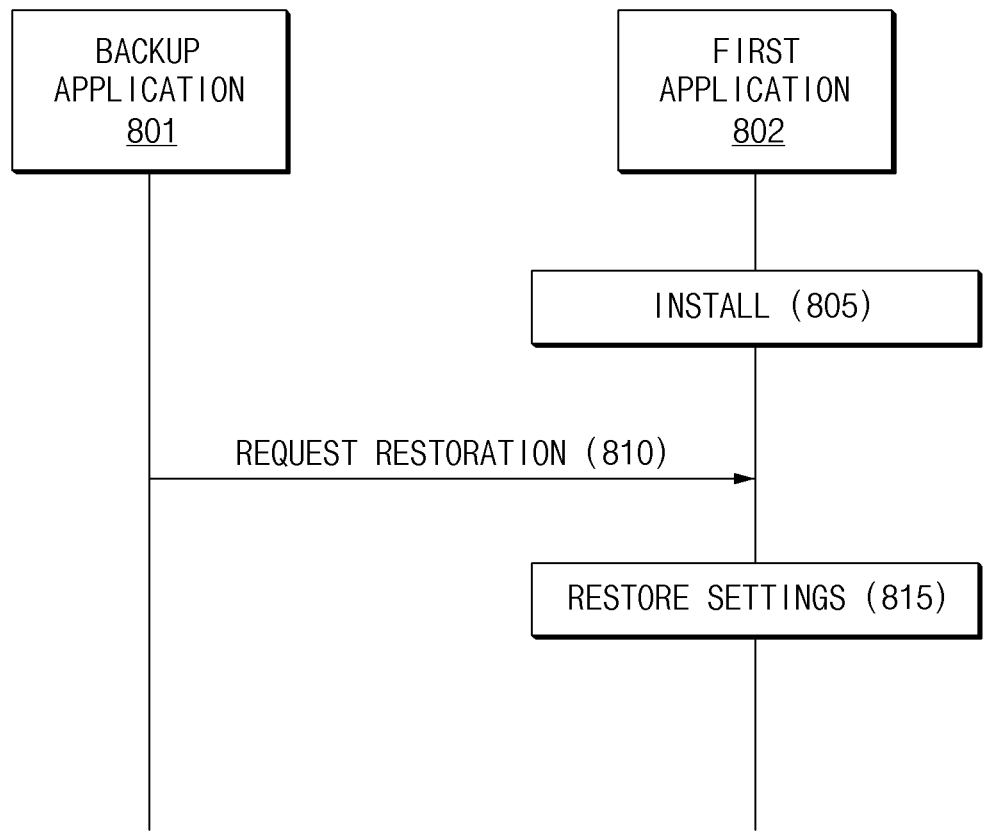
FIG. 8 is a signal flow diagram illustrating a method for restoring backup data according to an embodiment of the disclosure.

FIG. 8 is a signal flow diagram illustrating a method for restoring backup data according to an embodiment of the disclosure.

Referring to FIG. 8, the electronic device 201 may restore a first application 802 using a backup application 801.

According to an embodiment, in operation 805, the electronic device 201 may install the first application 802. For example, the electronic device 201 may install the first application 802 according to priorities. If the first application 802 is installed in advance, operation 805 may be omitted.

According to an embodiment, in operation 810, the backup application 801 may transfer, to the first application 802, a restoration request. The backup application 801 may transfer the restoration request using a message (e.g., a broadcast extra) for data transfer between applications. In an example, the restoration request may include application-related data encrypted with a random encryption key and encryption key information. For example, the backup application 801 may check whether the first application 802 is installed, and transmit the restoration request after the first application 802 is installed.

According to an embodiment, in operation 815, the first application 802 may restore settings using the received encrypted application-related data. The first application 802 may acquire the encryption key using the encryption key information, and decrypt the encrypted application-related data using the acquired encryption key.

Figure 9:
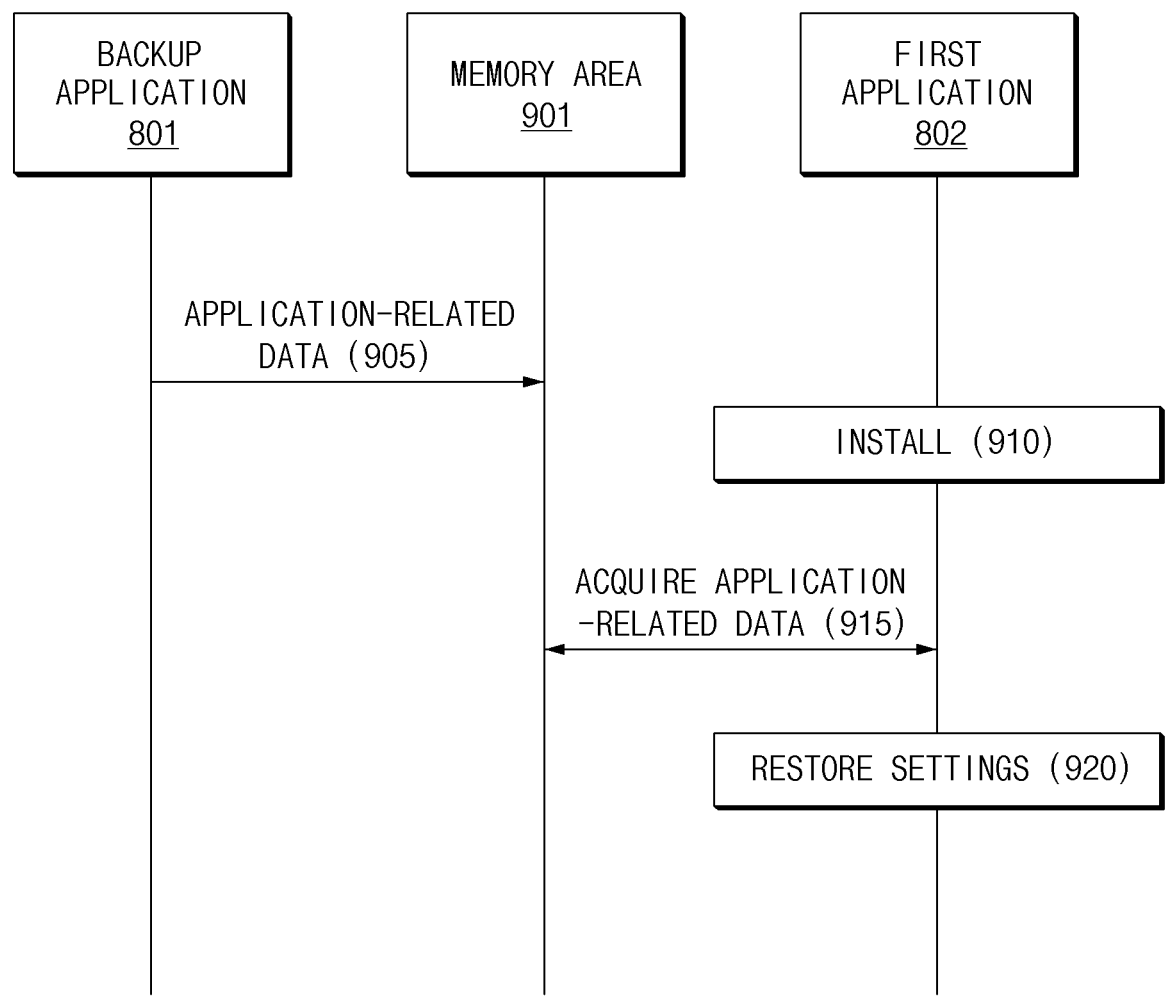
FIG. 9 is a signal flow diagram illustrating a method for restoring backup data according to an embodiment of the disclosure.

FIG. 9 is a signal flow diagram illustrating a method for restoring backup data according to an embodiment of the disclosure.

According to an embodiment, in operation 905, the backup application 801 may store application-related data for the first application in a specified path of a memory area 901. For example, the backup application 801 may check the installation state of the first application 802, and if the first application 802 is not installed, the backup application 801 may store application-related data in the memory area 901. If the first application 802 is not installed, the backup application may encrypt the application-related data using a specified encryption key and store the encrypted application-related data in the memory area 901.

According to an embodiment, in operation 910, the electronic device 201 may install the first application 802. After the first application 802 is installed, in operation 915, the first application 802 may acquire application-related data from the memory area 901. For example, the first application 802 may check whether application-related data exists in the specified path of the memory area 901. If there is the application-related data in the specified path, the first application 802 may acquire the application-related data.

According to an embodiment, in operation 920, the first application 802 may restore settings using application-related data. The first application 802 may decrypt the application-related data using the specified encryption key. The first application 802 may restore the settings of the first application 802 using the decrypted application-related data.

An electronic device (e.g., the electronic device 201 of FIG. 3) according to an embodiment may include a communication circuit (e.g., the communication circuit 390 of FIG. 3), a processor (e.g., the processor 320 of FIG. 2), and a memory (e.g., the memory 330 of FIG. 3) operatively connected to the processor. According to an embodiment, the electronic device may further include a display (e.g., the display 360 of FIG. 3). The memory may store instructions that, when executed, cause the processor to perform operations to be described below. The processor may be configured to connect to an external electronic device using the communication circuit, receive backup data including application information and application-related data from the external electronic device, install a plurality of applications using the application information, and sequentially restore settings of the plurality of applications using the application-related data based on priorities. For example, the priorities may be set based on at least one of an execution history, a frequency of use, or a file size for the plurality of applications in the external electronic device.

According to an embodiment, the processor may be configured to display, on the display, an icon corresponding to a first application of the plurality of applications if the first application is installed. The processor may be configured to display the icon in a state indicating that a setting of the first application is not restored before restoration of the setting after installation of the first application. For example, the processor may be configured to adjust the priorities so that the setting of the first application is preferentially restored, if a user input to the icon is received before restoration of the setting after installation of the first application. The processor may be configured to adjust the priorities so that a second application related to the first application is restored subsequent to the first application, if the user input to the icon is received before restoration of the setting after installation of the first application. For example, the processor may be configured to execute the first application in an initial state before restoration of the setting of the first application in response to the user input, and integrate a first setting of the first application acquired from the application-related data and a second setting of the first application acquired through the execution of the first application in the initial state. The processor may be configured to display, on the display, a user interface for providing a selection of at least one profile to be used for the first application, among at least one first profile of the first setting and at least one second profile of the second setting.

According to an embodiment, the processor may be configured to acquire application-related data corresponding to the first application stored in a specified path of the memory, and restore the setting of the first application by decrypting the application-related data using a specified encryption key.

According to an embodiment, the processor may be configured to receive the backup data using a wireless connection or a wired connection with the external electronic device substantially simultaneously.

A method for restoring data of an electronic device (e.g., the electronic device 201 of FIG. 3) according to an embodiment may include connecting to an external electronic device (the external electronic device 202 of FIG. 2), receiving backup data including application information and application-related data from the external electronic device (e.g., operation 405 of FIG. 4), installing a plurality of applications using the application information (e.g., operation 410 of FIG. 4), and sequentially restoring settings of the plurality of applications using the application-related data based on priorities (operation 415 of FIG. 4).

The method for restoring data of the electronic device may further include displaying, on a display of the electronic device, an icon corresponding to a first application of the plurality of applications if the first application is installed. For example, the displaying of the icon corresponding to the first application on the display of the electronic device may include displaying the icon in a state indicating that a setting of the first application is not restored before restoration of the setting after installation of the first application. The method for restoring data of the electronic device may further include adjusting the priorities so that the setting of the first application is preferentially restored, if a user input to the icon is received before restoration of the setting after installation of the first application. For example, the adjusting of the priorities may include adjusting the priorities so that a second application related to the first application is restored subsequent to the first application. For example, the sequential restoring of the settings of the plurality of applications may include acquiring application-related data corresponding to the first application stored in a specified path of the memory and restoring the setting of the first application by decrypting the application-related data using a specified encryption key.

The method for restoring data of the electronic device may further include executing the first application in an initial state before restoration of the setting of the first application in response to the user input and integrating a first setting of the first application acquired from the application-related data and a second setting of the first application acquired from the execution of the first application in the initial state.

The method for restoring data of the electronic device may further include displaying a user interface for providing a selection of at least one profile to be used for the first application, among at least one first profile of the first setting and at least one second profile of the second setting.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communication circuit;
    a processor; and
    a memory connected to the processor,
    wherein the memory stores instructions that, when executed, cause the processor to:
        connect to an external electronic device using the communication circuit,
        receive backup data including application information and application-related data from the external electronic device,
        install a plurality of applications using the application information, and
        sequentially restore settings of the plurality of applications using the application-related data based on priorities.

2. The electronic device of claim 1, further comprising:
a display,
wherein the instructions, when executed, cause the processor to display, on the display, an icon corresponding to a first application of the plurality of applications if the first application is installed.

3. The electronic device of claim 2, wherein the instructions, when executed, further cause the processor to display the icon in a state indicating that a setting of the first application is not restored before restoration of the setting after installation of the first application.

4. The electronic device of claim 3, wherein the instructions, when executed, further cause the processor to adjust the priorities so that the setting of the first application is preferentially restored, if a user input to the icon is received before restoration of the setting after installation of the first application.

5. The electronic device of claim 4, wherein the instructions, when executed, further cause the processor to adjust, if the user input to the icon is received before restoration of the setting after installation of the first application, the priorities so that a second application related to the first application is restored subsequent to the first application.

6. The electronic device of claim 3, wherein the instructions, when executed, further cause the processor to:
execute the first application in an initial state before restoration of the setting of the first application in response to user input, and
integrate a first setting of the first application acquired from the application-related data and a second setting of the first application acquired through the execution of the first application in the initial state.

7. The electronic device of claim 6, wherein the instructions, when executed, further cause the processor to display, on the display, a user interface for providing a selection of at least one profile to be used for the first application, among at least one first profile of the first setting and at least one second profile of the second setting.

8. The electronic device of claim 3, wherein the instructions, when executed, further cause the processor to:
acquire application-related data corresponding to the first application stored in a specified path of the memory, and
restore the setting of the first application by decrypting the application-related data using a specified encryption key.

9. The electronic device of claim 1, wherein the instructions, when executed, further cause the processor to receive the backup data using a wireless connection or a wired connection with the external electronic device substantially simultaneously.

10. The electronic device of claim 1, wherein the priorities are set based on at least one of an execution history, a frequency of use, or a file size for the plurality of applications in the external electronic device.

11. A method for restoring data of an electronic device, the method comprising:
connecting to an external electronic device;
receiving backup data including application information and application-related data from the external electronic device;
installing a plurality of applications using the application information; and
sequentially restoring settings of the plurality of applications using the application-related data based on priorities.

12. The method of claim 11, further comprising:
displaying, on a display of the electronic device, an icon corresponding to a first application of the plurality of applications if the first application is installed.

13. The method of claim 12, wherein the displaying of the icon corresponding to the first application on the display of the electronic device comprises displaying the icon in a state indicating that a setting of the first application is not restored before restoration of the setting after installation of the first application.

14. The method of claim 13, further comprising:
if a user input to the icon is received before restoration of the setting after installation of the first application, adjusting the priorities so that the setting of the first application is preferentially restored.

15. The method of claim 14, wherein the adjusting of the priorities comprises adjusting the priorities so that a second application related to the first application is restored subsequent to the first application.

16. The method of claim 13, further comprising:
executing the first application in an initial state before restoration of the setting of the first application in response to user input; and
integrating a first setting of the first application acquired from the application-related data and a second setting of the first application acquired through the execution of the first application in the initial state.

17. The method of claim 16, further comprising: displaying a user interface for providing a selection of at least one profile to be used for the first application, among at least one first profile of the first setting and at least one second profile of the second setting.

18. The method of claim 13, further comprising:
acquiring application-related data corresponding to the first application stored in a specified path of a memory; and
restoring the setting of the first application by decrypting the application-related data using a specified encryption key.

19. The method of claim 11, further comprising: receiving the backup data using a wireless connection or a wired connection with the external electronic device substantially simultaneously.

20. The method of claim 11, wherein the priorities are set based on at least one of an execution history, a frequency of use, or a file size for the plurality of applications in the external electronic device.

* * * * *